(12) United States Patent
Elser et al.

(10) Patent No.: US 8,487,491 B2
(45) Date of Patent: Jul. 16, 2013

(54) INSULATING RETAINING ELEMENT FOR PHASE POTENTIAL BARS

(75) Inventors: Armin Elser, Alfdorf-Brech (DE); Peter Marschall, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 332 days.

(21) Appl. No.: 12/908,041

(22) Filed: Oct. 20, 2010

(65) Prior Publication Data

US 2012/0098363 A1 Apr. 26, 2012

(51) Int. Cl.
*H02K 3/38* (2006.01)

(52) U.S. Cl.
USPC .............................................. 310/71; 310/43

(58) Field of Classification Search
USPC .............................. 310/43, 45, 71
See application file for complete search history.

(56) References Cited

U.S. PATENT DOCUMENTS

| | | | | |
|---|---|---|---|---|
| 4,490,636 | A * | 12/1984 | McBratney | 310/71 |
| 6,429,557 | B2 * | 8/2002 | Sheeran et al. | 310/71 |
| 6,933,636 | B2 * | 8/2005 | Miya et al. | 310/71 |
| 2006/0043806 | A1 * | 3/2006 | Torii et al. | 310/71 |
| 2006/0138883 | A1 * | 6/2006 | Yagai et al. | 310/71 |
| 2006/0226719 | A1 * | 10/2006 | Nakanishi et al. | 310/68 B |
| 2007/0241625 | A1 * | 10/2007 | Terauchi | 310/68 B |

* cited by examiner

*Primary Examiner* — Burton Mullins
(74) *Attorney, Agent, or Firm* — Kenyon & Kenyon LLP

(57) ABSTRACT

A stator for an electric motor has phase potential bars and an insulating retaining element. The insulating retaining element includes a first component configured to accommodate the phase potential bars and to insulate the phase potential bars electrically from one another. The insulating retaining element additionally includes a second component which is separate from the first component. The second component, in conjunction with the first component, forms a trough that borders on the phase potential bars.

12 Claims, 8 Drawing Sheets

(L-L)

(K-K)

INSULATING RETAINING ELEMENT FOR PHASE POTENTIAL BARS

BACKGROUND OF THE INVENTION

1. Field of the Invention

The present invention relates to a stator having an insulated retaining element.

2. Description of the Related Art

Stator windings of electric motors are made up of single coils, for example, and as a rule they have a high interconnection cost. Alternating current motors and three-phase a.c. motors, for example, require many connecting points, such as welded connections, for interconnecting individual coil wires to phase potentials. Because of low available working space, the welds may be accessible to welding tools only with difficulty.

Furthermore, uninsulated connecting points and welds cannot show insulated phase potential. They have to be insulated using an insulating material. The process of applying the insulating material may be connected with considerable space requirement.

BRIEF SUMMARY OF THE INVENTION

An object of the present invention is to provide an improved stator and a method for producing a stator having an appropriately insulated retaining element, which makes it possible to get around the abovementioned problems.

According to a first aspect of the present invention, a stator for an electric motor is described. The stator has at least two phase potential bars and an insulating retaining element. The insulating retaining element has a first component which is designed to accommodate the phase potential bars and electrically insulate them from one another. Furthermore, the insulating retaining element has a second component which, together with the first component, forms a trough bordering on the phase potential bars. The second component is implemented separately from the first component, in this context.

To express it another way, the idea of the present invention is based on a two-part execution of the insulating retaining element of the stator. This makes possible, for example, that phase potential bars are first introduced into the first component and that they are optimally accessible for welding tools at the connecting points. Furthermore, the first component is executed as part of a trough shape which is supplemented or completed by the second component, so that the insulating retaining element is suitable for a molding process following the welding, using an insulating material.

The insulating retaining element is configured as a part of a stator of an electric motor. The first component may, for instance, be developed as a carrier or interconnecting ring and may accommodate at least two phase potential bars. The phase potential bars may run, for instance, on circular paths parallel to one another, i.e. on concentric circles. For the accommodation of the phase potential bars, the first component has cut-outs into which the phase potential bars may be set. The first component has an insulating material or an insulating coating, so that the potential bars are electrically insulated from one another.

The phase potential bars are line bars or bus bars. The phase potential bars correspond to different phases. Three phase potential bars may also be provided, which correspond to the three phases of a three-phase motor. Adjoining phase potential bars may in each case have different potentials, in this context.

The second component may, for instance, be developed as a piece attachable to the first component. The second component may be developed as a bulkhead ring. In the assembled state, the first and the second components form a trough or a cavity which has room for the phase potential bars and an insulating material. The cavity is created between the first and the second component, and borders on the cut-outs for the phase potential bars. The second component may have two parts, such as an inner and an outer wall. The inner wall may have a smaller circumference or diameter than the outer wall, for example. The inner and the outer wall may be developed separately, for example, and may be placed on respectively opposite sides of the first component. Alternatively, the inner and the outer wall of the second component may be connected to each other by crosspieces. The inner and the outer wall of the second component may be positioned perpendicular to the first component and parallel to each other, so that a trough is created that is open towards the top. Alternatively, the first and the second component may together form a cavity, so that a closed space is created around the phase potential bars, which has openings and recesses, through which an insulating material is able to be filled in.

The embodiment of the second component, separately from the first component, first makes possible the embedding of the phase potential bars in the first component and the welding of the coil wires, associated with the respective phase potential, to the phase potential bars at good accessibility for the welding tools. After the mounting of the second component, a sealed molding trough is formed, through which, for example, the complete interconnecting region is able to be compound-filled using an insulating material. After the insulating material cures, the first and the second components form a unit and remain together. Furthermore, the second component makes a multi-part molding trough that takes up much space, into which the first element would have to be fitted, superfluous, and thus ensures a saving of space.

According to one exemplary embodiment of the present invention, the second component has a first recess for filling in the insulating material. The second component may have a plurality of first recesses, which are dimensioned so that the filling in of the insulating material is possible. The first recess may be continuous, which means that the second component may be made up of two parallel sidewalls and a plurality of connecting elements holding these sidewalls together. The first recess may be developed as the upper opening of the trough. The insulating material may be a resin, a plastic or silicone, for example.

According to a further exemplary embodiment of the present invention, after the phase potential bars have been integrated into the first component, the second component is slipped on or mounted on the first component to form the trough or a cavity. In other words, the two components are joined together.

According to one further exemplary embodiment of the present invention, the second component is embodied so as to snap in automatically with the first component. For this purpose, latches may be situated, for instance, on the first component and/or on the second component. In addition or alternatively, a so-called click-and-snap connection may be provided. If, for example, latches are provided on the second component, corresponding guidance elements may be provided on the first component. The second component snaps in automatically with the first component, that is, with the aid of the latches and the guidance elements the second component is positioned and fixed with respect to the first component, without the latter having to be accurately aligned by the user.

According to another exemplary embodiment of the present invention, the insulating retaining element has an insulating material having a certain tenacity, also called viscosity. The insulating material is filled into the trough through the first recess in the second component and fills it up. The insulating material is electrically non-conductive.

According to yet another exemplary embodiment of the present invention, at least one second recess is provided between the first component and the second component. In other words, the boundaries of the trough or the cavity may have at least one second recess. The boundaries of the cavity are formed by the first and the second component. Furthermore, additional elements, such as a rear panel of a coil brace, may form a part of the boundary of the cavity. The second recess may be made up of one or more gaps, for instance, which are present between the boundaries forming the cavity. The dimensions of the second recess, that is, the distances between the elements forming the boundaries of the cavity or the trough are selected so that the insulating material cannot pass the second recess because of its tenacity. This means that the insulating material cannot flow out through a gap or opening between the first and the second component, for example.

The tenacity or viscosity measured in millipascal seconds may amount to 2250±250 mPas (MF8044 UV) or 7000±500 mPas (E 4011 UV) in the case of resins. In the case of silicones, the viscosity, for example, for RT705 at rest may amount to 72500 mPas, and dynamically (when stirred, for instance), to 13000 mPas. For elastosil RT772, the dynamic viscosity may amount to 20000 mPas. The curing agent T77 may have a viscosity of 150000 mPas. A mixture of RT772 and T77 may have a viscosity of 35000 mPas, for example.

According to one further exemplary embodiment of the present invention, the second component has a third recess, which has a geometry that is equivalent to the cross-section of a wire, for instance, of a coil wire. In other words, the attachable piece has a special opening that is adapted to the entering coil wire. This region of the second component may be developed as a wire opening, and may correspond, for instance, to the cross-section of a wound coil wire. In this context, the dimensions or the geometry of the third recess are selected in such a way that, on the one hand, manufacturing tolerances of the coil wire are taken into account, such as different winding diameters around the pins of coil braces. And on the other hand, as good as possible a sealing exists between the individual components.

The dimensions of the second recess, for example, between the outer diameter of the second component and the first component, may amount to ca. 0.1 to 0.2 mm. The dimensions of the second recess and of the gap between the attachable piece and the coil brace wall may be 0.2 to 0.4 mm, for example. The dimensions of the third recess and of the wire opening may be between 0.1 and 0.5 mm, for example. At these dimensions, the insulating material having a tenacity of 35000 mPas, for example, cannot pass through the recesses.

According to a further exemplary embodiment of the present invention, the insulating retaining element is made ring-shaped. The insulating retaining element may alternatively be developed to be oval or as a segment of a ring. Because of the ring-shaped design, the insulating retaining element may be adapted to the stator of a disk-like small electric motor.

According to yet another exemplary embodiment of the present invention, the second component is designed in two parts. The second component has an inner ring, in this instance, and an outer ring, which are able to be mounted independently of each other and/or snapped together.

According to a second aspect of the present invention, an electric motor is described. This electric motor has a stator, described above, having an insulating retaining element.

According to a third aspect of the present invention, a method is described for producing a stator having an insulating retaining element, described above. The method has the following steps: providing a first component having cut-outs for phase potential bars; fitting the phase potential bars into the first component; welding coil wires onto the phase potential bars; mounting a second component onto the first component, so that the first component and the second component form a trough bordering on the phase potential bars; filling up the trough with an insulating material through the first recess in the second component.

DETAILED DESCRIPTION OF THE INVENTION

Figure 1:
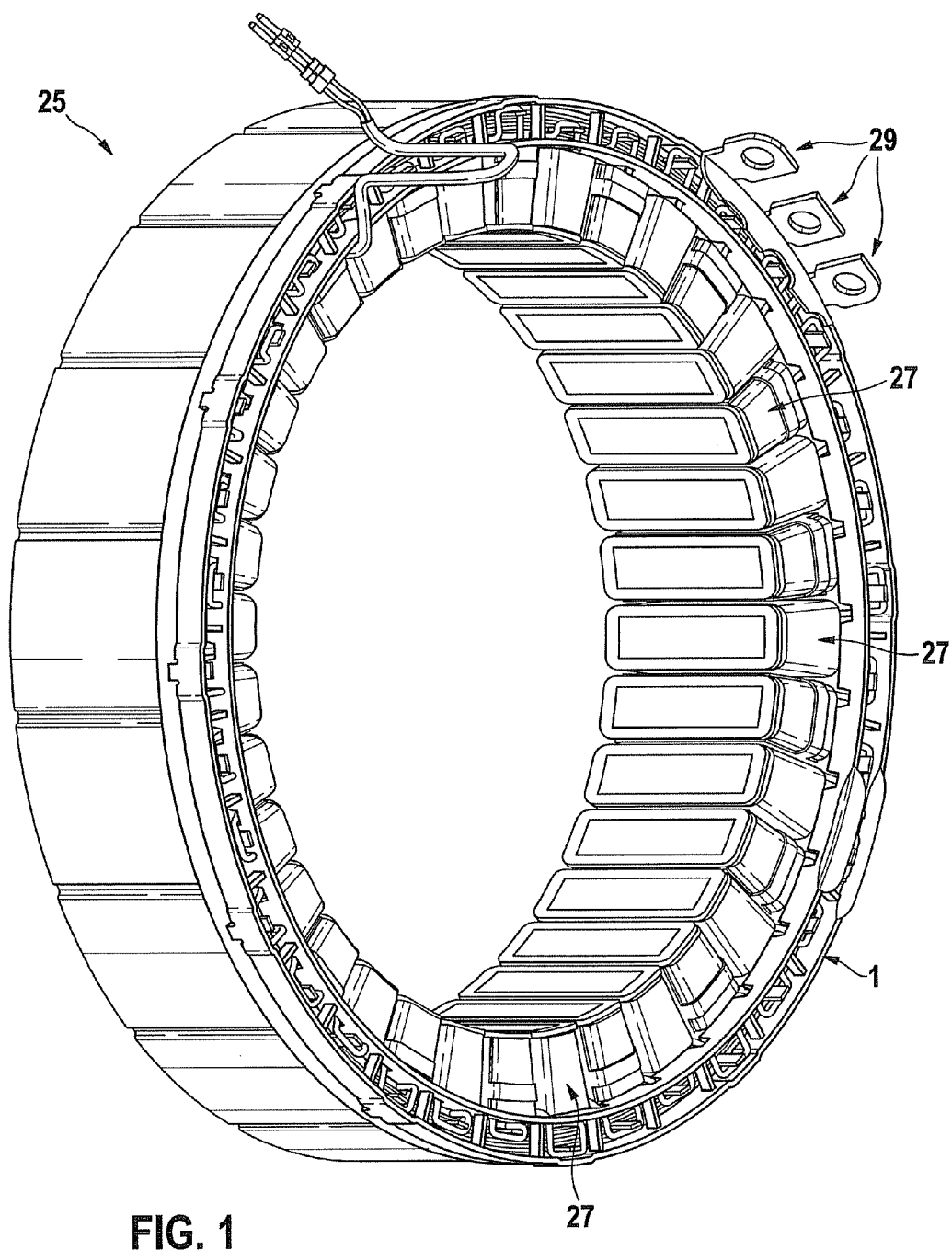
FIG. 1 shows a perspective side view of a ring-shaped stator having an insulating retaining element.

All the figures in the present disclosure are merely schematic representations of the devices and their incorporated components according to exemplary embodiments of the present invention. For example, distances and size relationships are not reflected in the figures as being to scale. In addition, in the various figures, corresponding elements are provided with the same reference numerals.

Figure 2:
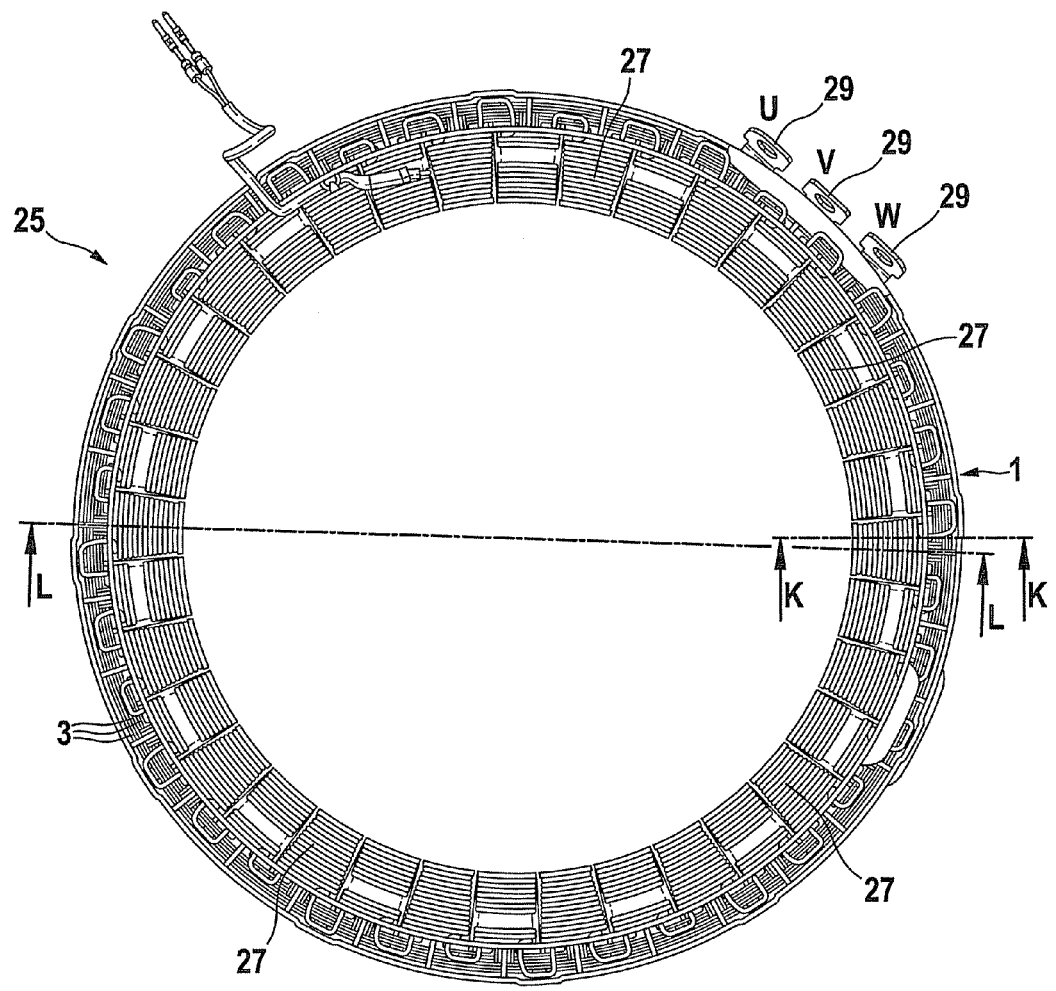
FIG. 2 shows a top view OF the stator shown in FIG. 1.

FIG. 1 shows a perspective side view of a ring-shaped stator for a narrow motor. Ring-shaped stator 25 having insulating retaining element 1 may be used in hybrid vehicles, for example. In the exemplary embodiment in FIG. 1, a three-phase motor is shown having 36 coils 27. FIG. 2 shows a top view onto the stator of FIG. 1. So-called protruding tabs 29 are situated on phase potential bars 3 situated in insulating retaining element 1. At protruding tabs 29, different potentials are applied, designated here as U, V, W.

Figure 3:
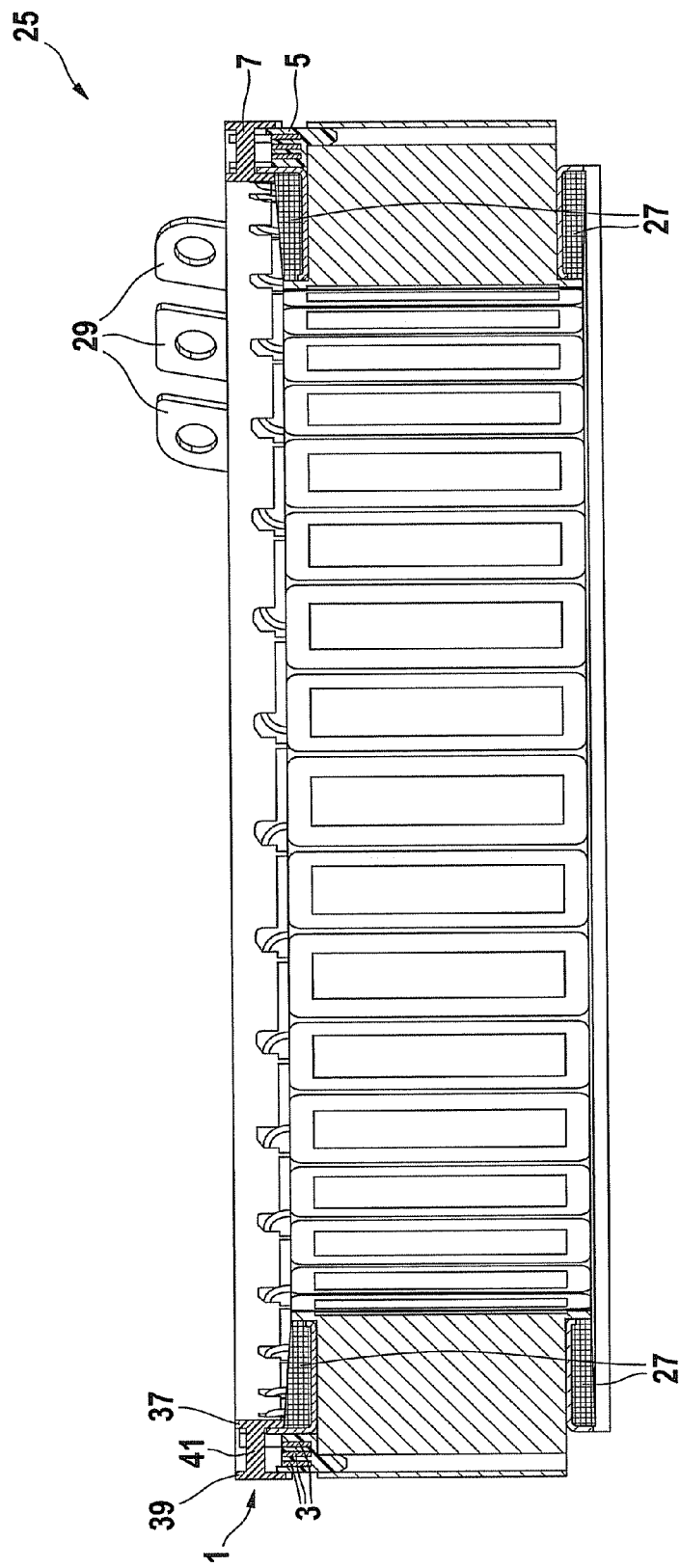
FIG. 3 shows a cross-section of the stator of FIG. 2 along the line L-L.
Figure 4:
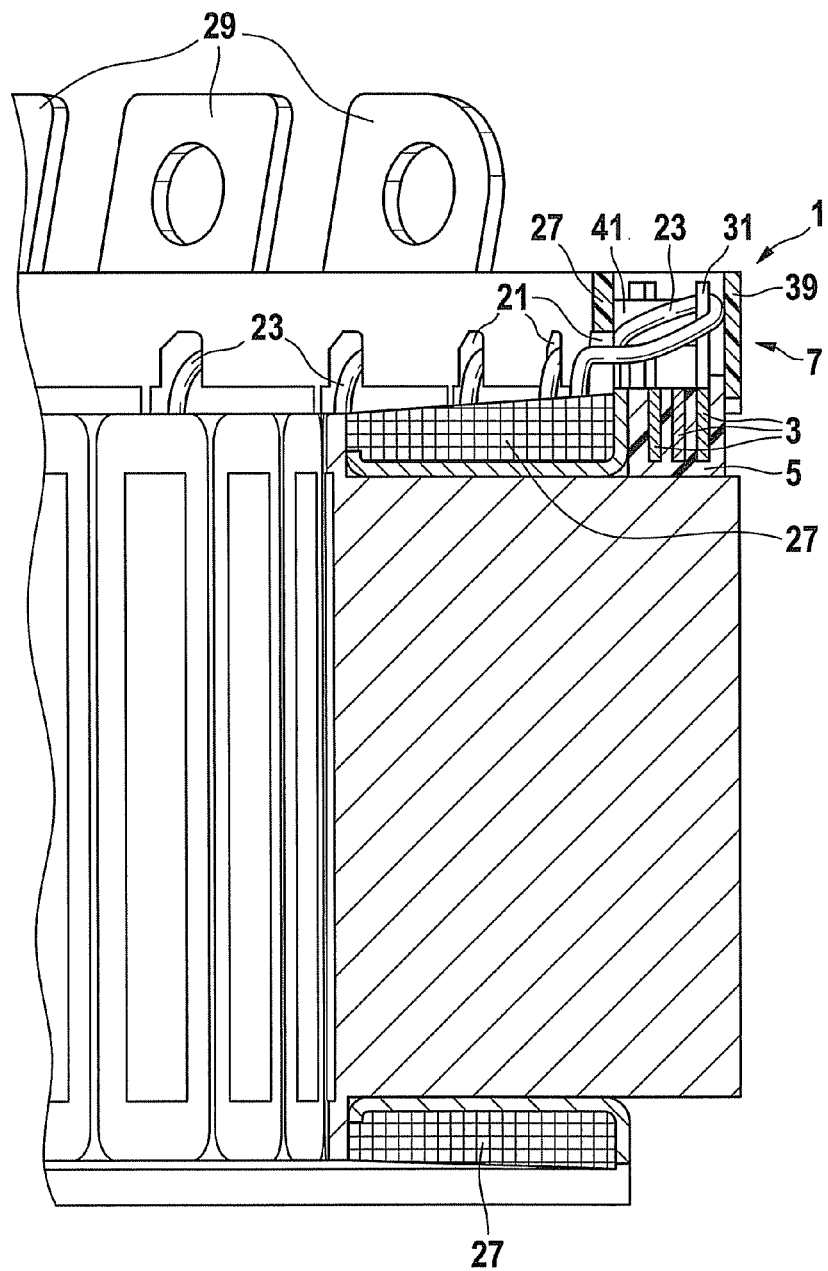
FIG. 4 shows a cross-section of the stator of FIG. 2 along the line K-K.

FIGS. 3 and 4 show different sections of stator 25 shown in FIG. 2. In FIG. 3, for instance, a cross-section is shown of the stator in FIG. 2, along line L-L. From this it may be seen how insulating retaining element 1 is situated at the edge of coils 27 on stator 25. In this instance, the three phase potential bars 3 are integrated into first component 5, developed in this case as an interconnecting ring. Second component 7, developed in this instance as an attachable piece, is set onto first component 5, similarly to a separate bulkhead ring. Second component 7 is able to be made up, in this context, of an inner wall 37, or rather an inner ring, and an outer wall 39, or rather an outer ring, which are situated concentrically. Inner wall 37 and outer wall 39 are able to be developed separately or may be connected to each other by crosspieces 41.

The illustration in FIG. 3 shows cross-sections of stator 25 at the level of a coil 27, so that a cross-section of coil 27 is also visible. Moreover, FIG. 3 shows a connecting crosspiece 41 between inner and outer wall 37, 39. FIG. 4 shows a cross-section at the height of a third recess 21, that is, at the location of a wire opening in inner wall 37 of second component 7.

Figure 5:
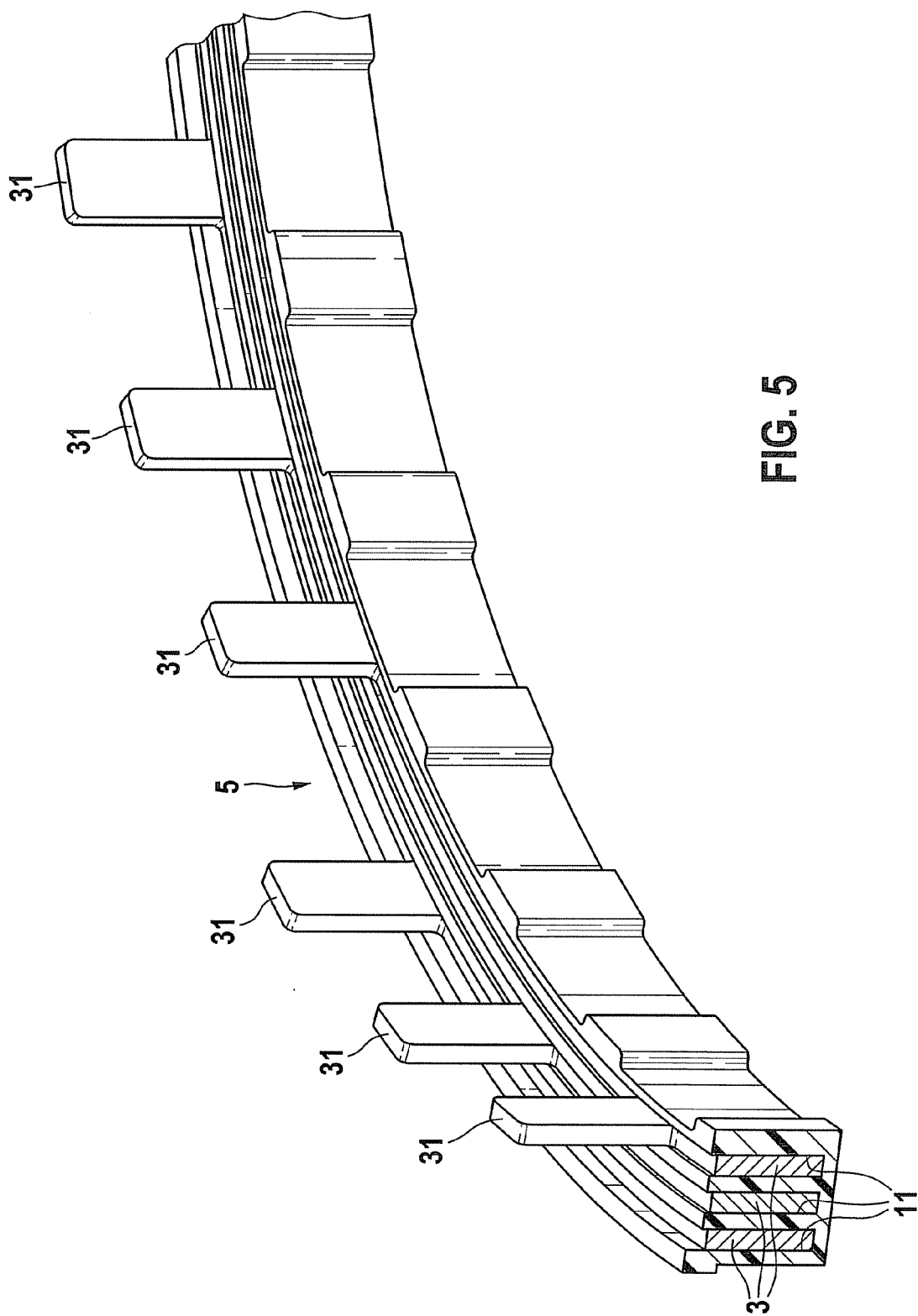
FIG. 5 shows a perspective side view of a first component having phase potential bars.

FIG. 5 shows first component 5 in detail. Three phase potential bars 3 are each fitted into separate cut-outs 11 of first component 1. Phase potential bars 3 have a plurality of current-carrying lugs 31, to which coil wires 23 may be welded. As may be seen in FIGS. 5 and 6, first component 5 makes possible an optimal accessibility for welding tools at the connecting locations, such as at current-carrying lugs 31.

Figure 6:
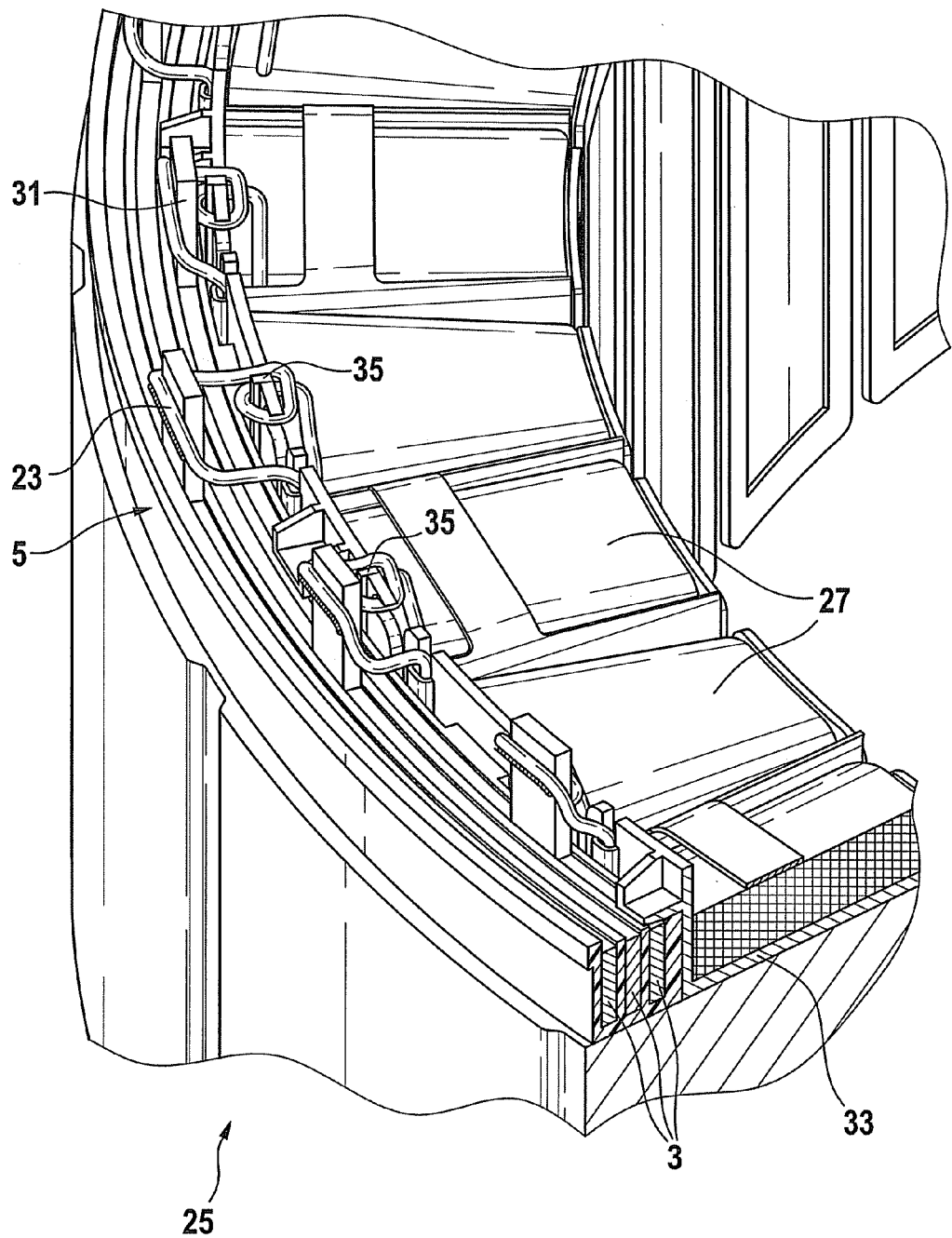
FIG. 6 shows a perspective side view of a cut-out of the stator with the first component.

FIG. 6 shows how coil wires 23, that lead from coils 27, are wound around pins 35 of coil brace 33 and welded to current-carrying lugs 31. First component 5 makes possible a free selection possibility of the welding method or connecting method without restricting the accessibility to the welding lugs or current-carrying lugs 31.

Figure 7:
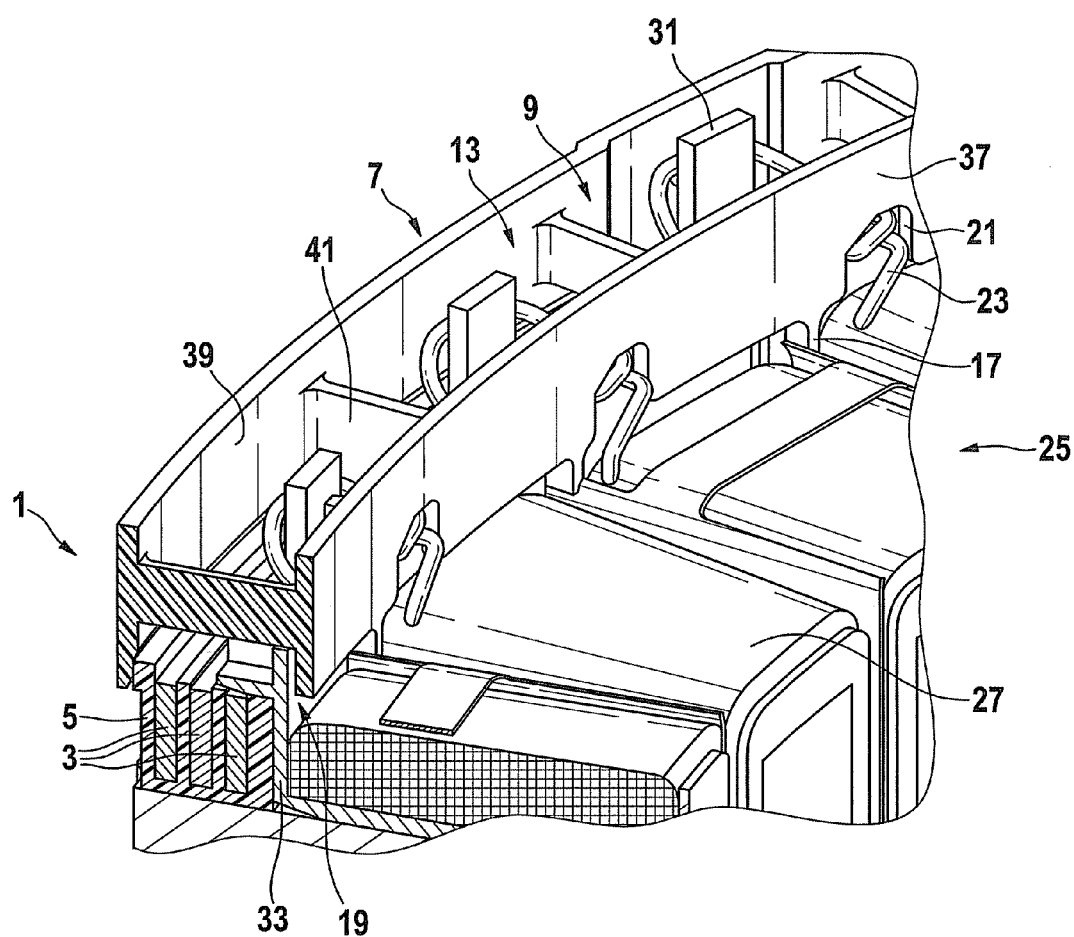
FIG. 7 shows a perspective side view of a cut-out of the stator with the first and second components.

As shown in FIG. 7, after the welding process, second component 7, developed in this instance as an attachable piece, is able to be slipped onto first component 5. In FIG. 7, second component 7 is located above first component 5. It is slipped onto first component 5, and thus forms a trough shape 9, or a predefined cavity. Because of the trough shape thus created, the complete interconnection region is able to be compound-filled with an insulating material (not shown in the figures). The molding compound, or rather the insulating material may be a resin, a plastic or a silicone, for example.

Cavity 9 may be defined, for instance, by the height of the sidewalls of the second component, for example. Second component 7 may have a first recess 13 or a first cut-out, through which the insulating material is able to be filled in. The first cut-out may be a hole, for example, through which trough 9, or the cavity, is filled up. Alternatively, first recess 13 is implemented by a missing cover over the walls of the second component, as shown in FIG. 7. The boundaries of trough 9 or the cavity have a second recess. In other words, gaps 19 are present between first component 5 and second component 7. The dimensions of this gap or second recess 19 are selected so that after the latching of first component 5 into second component 7, the molding compound is prevented by its tenacity from running out.

As shown in FIG. 7, trough 9 or the cavity may also be bounded by additional components. One additional element that is able to bound trough 9 is, for instance, the back wall of coil brace 33. Second component 7 may close with the back wall of coil brace 33, while maintaining a gap measure, so that gap 19, that is created, acts as a labyrinth seal for the molding compound. The molding compound is prevented from flowing out of trough form 9 by the labyrinth seal. This means an extension of the effective sealing path about an additional component, namely, coil brace 33.

The attachable piece, or rather component 7, also has a third cut-out 21, which is adapted in its geometry to incoming coil wire 23. Consequently, a high degree of sealing is achieved at this location, at as large as possible a joining gap. Third cut-out 21 may also be designated as a wire opening, and in its shape and position leans against wound coil wire 23.

Moreover, first component 5 and/or second component 7 have latches 17, so that an independent fixing is made possible during assembly, which makes superfluous any additional positioning and/or mounting support during the molding process and the subsequent curing process of the insulating compound.

During or after the curing process, the insulating material forms a fixed chemical and/or form-locking connection to first component 5, to second component 7 and perhaps to phase potential bars 3.

Figure 8:
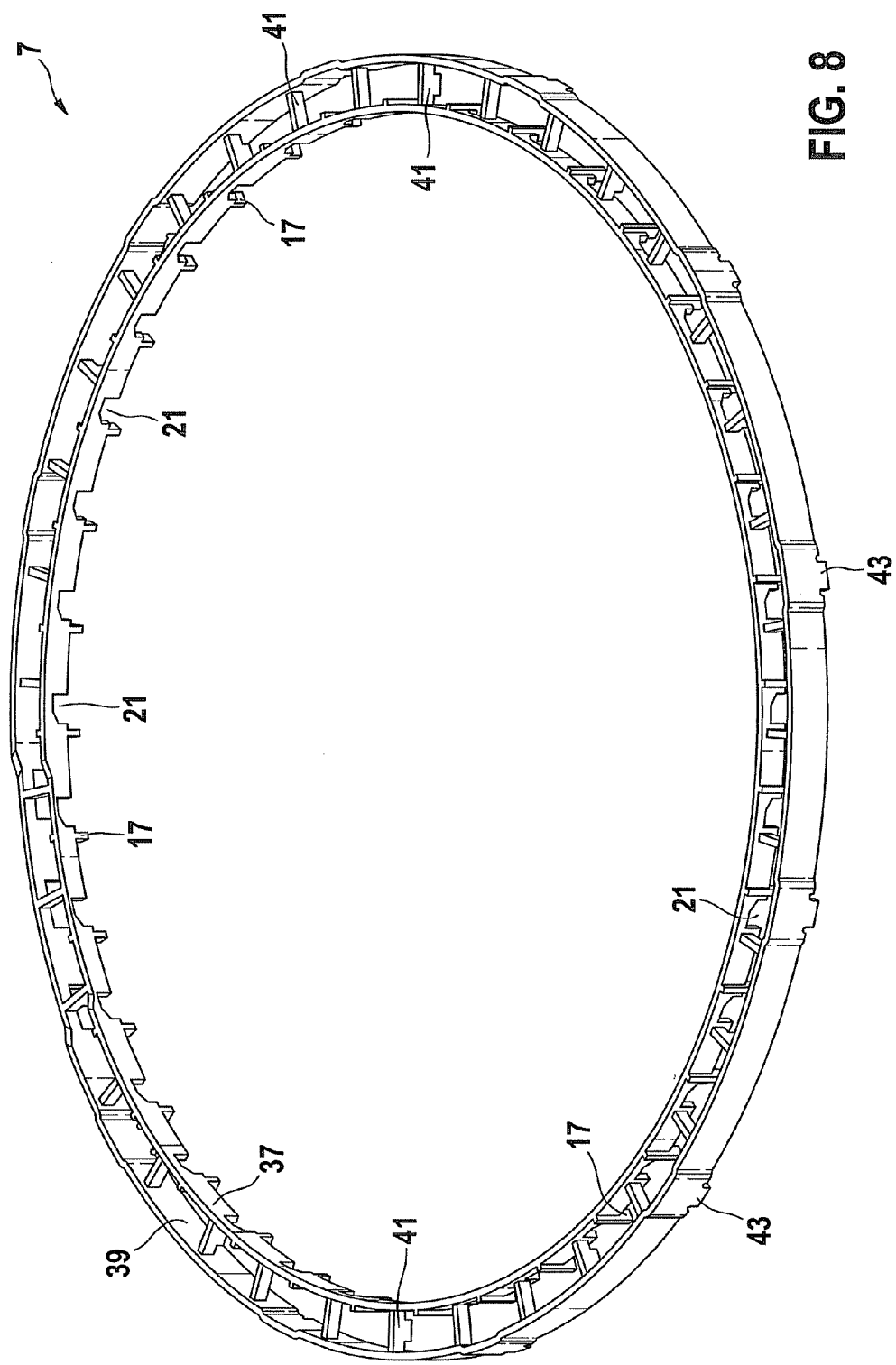
FIG. 8 shows a perspective top view of the second component.

FIG. 8 shows ring-shaped second component 7 in detail. It has an inner wall 37 and an outer wall 39, that are able to be mounted separately, and that are connected by crosspieces 41 in the exemplary embodiment. Second component 7 has latches 17 at inner wall 37, for example, which are able to ensure the positioning and fixing of the attached part. Furthermore, latching elements 43 may be provided on outer wall 39, which are able to engage with corresponding elements on first component 5.

What is claimed is:

1. A stator for an electric motor, comprising:
   a plurality of phase potential bars;
   an insulating retaining element having a first component and a second component, wherein the first component is configured to accommodate the phase potential bars and to insulate the phase potential bars electrically from one another, and wherein the second component forms, in conjunction with the first component, a trough bordering on the phase potential bars, and wherein the second component is separate from the first component, the second component being configured to latch in with the first component.

2. The stator as recited in claim 1, wherein the second component has a first recess configured to facilitate filling in using an insulating material.

3. The stator as recited in claim 2, wherein the second component is mounted onto the first component to form the trough.

4. The stator as recited in claim 3,
   wherein the insulating material has viscosity, and wherein the insulating material fills up the trough between the first and second components.

5. The stator as recited in claim 4, wherein a second recess is provided between the first component and the second component, and wherein the dimensions of the second recess are selected such that the insulating material is not able to pass through the second recess due to viscosity of the insulating material.

6. The stator as recited in claim 5, wherein the second component has a third recess with a geometry corresponding to the cross-section of a wire.

7. The stator as recited in claim 4, wherein the insulating retaining element is ring-shaped.

8. The stator as recited in claim 4, wherein the second component has an inner wall and an outer wall separate from one another.

9. An electric motor, comprising:
   a stator including:
      a plurality of phase potential bars;
      an insulating retaining element having a first component and a second component, wherein the first component is configured to accommodate the phase potential bars and to insulate the phase potential bars electrically from one another, and wherein the second component forms, in conjunction with the first component, a trough bordering on the phase potential bars, and wherein the second component is separate from the first component, the second component being configured to latch in with the first component; and
      an insulating material, wherein the insulating material has viscosity, and wherein the insulating material fills up the trough between the first and second components.

10. A method for producing a stator having an insulating retaining element, the method comprising:
    providing a first component of the insulating retaining element;

fitting a plurality of phase potential bars into the first component;
welding coil wires to the phase potential bars;
setting a second component of the insulating retaining element onto the first component such that the first component and the second component form a trough bordering on the phase potential bars, the second component being configured to latch in with the first component; and
filling up the trough with an insulating material.

11. A stator for an electric motor, comprising:
a plurality of phase potential bars;
an insulating retaining element having a first component and a second component, wherein the first component is configured to accommodate the phase potential bars and to insulate the phase potential bars electrically from one another, and wherein the second component forms, in conjunction with the first component, a trough bordering on the phase potential bars, and wherein the second component is separate from the first component, wherein the second component has a first recess configured to facilitate filling in using an insulating material, wherein a second recess is provided between the first component and the second component, and wherein the dimensions of the second recess are selected such that the insulating material is not able to pass through the second recess due to viscosity of the insulating material.

12. The stator as recited in claim 11, wherein the second component has a third recess with a geometry corresponding to the cross-section of a wire.

* * * * *